United States Patent [19]

Seitz et al.

[11] 3,836,926

[45] Sept. 17, 1974

[54] PIN CUSHION DISTORTION CORRECTION LENS

[75] Inventors: Paul N. Seitz, Milpitas; Gerald C. Cox, Fremont; Rolf D. Kahle, Saratoga, all of Calif.

[73] Assignee: Quantor Corporation, Cupertino, Calif.

[22] Filed: Mar. 27, 1972

[21] Appl. No.: 238,549

Related U.S. Application Data

[63] Continuation-in-part of Ser. No. 59,614, July 30, 1970, abandoned.

[52] U.S. Cl. ...................... 95/12, 178/7.85, 355/20, 346/110

[51] Int. Cl. ........................................ G03b 29/00

[58] Field of Search .......... 95/12; 178/7.85; 355/20; 346/110

[56] References Cited

UNITED STATES PATENTS

| | | | |
|---|---|---|---|
| 2,093,288 | 9/1937 | Ogloblinsky | 178/7.85 X |
| 2,188,581 | 1/1940 | Schlesinger | 178/7.85 |
| 2,203,483 | 6/1940 | Banks | 178/7.85 X |
| 2,307,210 | 1/1943 | Goldsmith | 178/7.85 |
| 2,346,810 | 4/1944 | Young | 178/7.85 X |
| 2,517,774 | 8/1950 | Epstein | 178/7.85 |
| 2,531,956 | 11/1950 | Waldorf et al. | 178/7.85 X |

*Primary Examiner*—Robert P. Greiner

*Attorney, Agent, or Firm*—Townsend and Townsend

[57] ABSTRACT

A pin cushion distortion correction system for magnetically deflected cathode ray tubes in which a plano-convex lens adapted to optically correct for pin cushion distortion is disposed in front of the cathode ray tube. The curvature of the lens is suitably selected to impart greater optical gain in the center and lesser optical gain towards the edges so as to complement, and thereby cancel or correct, the pin cushion distortion.

2 Claims, 2 Drawing Figures

PIN CUSHION DISTORTION CORRECTION LENS

This application is a continuation-in-part application of our earlier copending Pat. application, Ser. No. 59,614, filed July 30, 1970 for "Pin Cushion Distortion Correction Lens", now abandoned.

This invention relates to a pin cushion distortion correction lens for magnetically deflected cathode ray tubes.

In a magnetically deflected cathode ray tube, a particular type of geometric distortion, namely the so-called pin cushion effect, is known to exist. This distortion is characterized by disproportionately large deflections of the electron beam as the angle of deflection increases, resulting in a non-linear display. In the prior art is is known to employ a curved face cathode ray tube to minimize this distortion. However, such a solution is undesirable as the curvature required to achieve satisfactory correction is often impractically large, and requires viewing from very large distances to obtain the desired correction.

In the prior art, attempts have been made to correct for pin cushion distortion in a flat faced cathode ray tube through the use of external field correction employing magnets to compensate for the pin cushion effect or, electrical wave shaping techniques to predistort the deflection current to compensate for the pin cushion effect. Both of these techniques have proved to be unduly complex, costly and unreliable. Furthermore, in applications where precision positioning of the cathode ray tube beam is desired, rather than a constant frequency raster, or where plural deflection coils are to be employed, the efficacy of these solutions is further reduced.

Accordingly, it is an object of the present invention to provide a relatively simple, inexpensive and reliable system for correcting pin cushion distortion in a magnetically deflected cathode ray tube.

Another object of the present invention is to provide a pin cushion distortion correction system for a magnetically deflected cathode ray tube that is particularly well suited for use when non-raster, high precision beam positioning is desired.

A further object of the present invention is to provide a pin cushion distortion correction system for a magnetically deflected cathode ray tube that is particularly well suited for use when plural deflection coils are to be employed.

Still another object of the present invention is to provide a lens, which, when placed in front of a magnetically deflected cathode ray tube, substantially corrects for pin cushion distortion.

These objects are met in accordance with the present invention by providing a planoconvex lens disposed in front of the magnetically deflected cathode ray tube, and adapted to optically correct for the pin cushion distortion inherent in the magnetically deflected cathode ray tube by imparting an optical gain to the image produced by the cathode ray tube which complements the pin cushion effect distortion, so that the image observable therethrough will appear substantially undistorted.

Such a pin cushion distortion correction lens is advantageous in that pin cushion distortion correction may thus be obtained through the use of a single, low cost, component of high reliability. Furthermore, since the pin cushion distortion correction is accomplished optically, rather than electronically or magnetically, the distortion correction lens according to the present invention may be readily employed with multiple deflection coils and/or high precision, non-raster type displays.

These and other objects, features and advantages of the present invention will be more readily apparent from the following detailed description of the present invention, with reference to the accompanying drawings, wherein.

Figure 1:
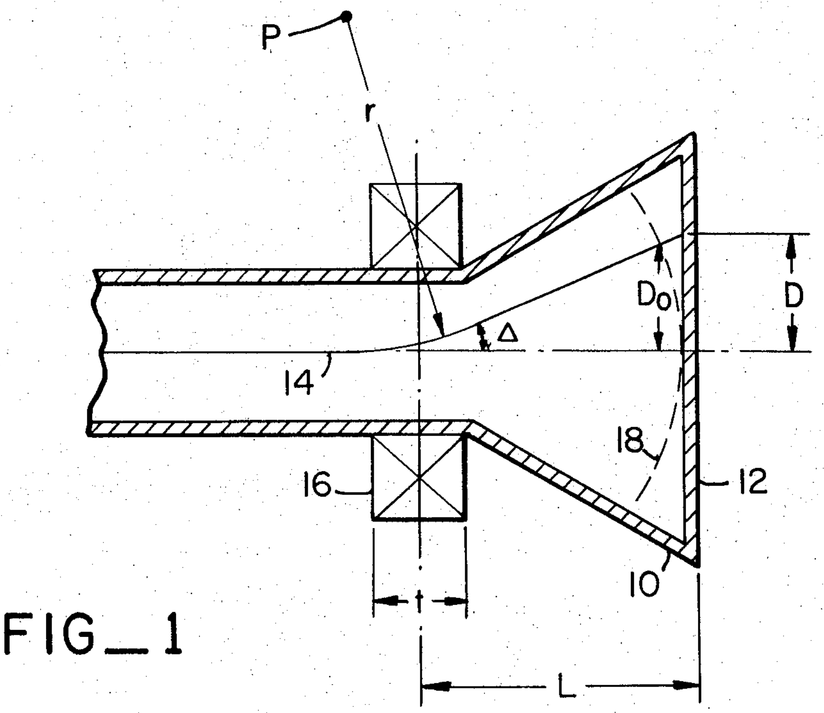
FIG. 1 is a diagrammatic view of a magnetically deflected cathode ray tube.

Referring initially to FIG. 1, there is shown a magnetically deflected cathode ray tube 10 having a flat front face 12. An electron beam 14 is produced by an electron gun (not shown) and is directed along the axis of cathode ray tube 10. A magnetic deflection coil 16 is disposed around cathode ray tube 10 along the path of electron beam 14 and is employed to deflect electron beam 14 in response to an electrical signal applied thereto. The foregoing magnetically deflected cathode ray tube structure is old in the art and is described herein for illustrative purposes only, it being understood that the distortion correction lens according to the present invention may be employed with other cathode ray tube configurations.

The passage of electron beam 14 through the magnetic field produced by the deflection coil 16 results in a bending or deflection of the beam as illustrated in FIG. 1, causing beam 14 to impinge on the front face 12 of cathode ray tube 10 at a distance D from the axis of cathode ray tube 10. Of course, distance D is dependent upon the magnetic field strength of the deflection coil 16 and thus, the current through deflection coil 16. Ideally, distance D is directly proportional to the current through deflection coil 16, so that the display produced on the front face 12 of cathode ray tube 10 will be linear and thus free of pin cushion distortion. However, in reality, distance D is not directly proportional to the current through deflection coil 16.

In greater detail, the passage of electron beam 14 through the field of deflection coil 16 causes electron beam 14 to follow an arcuate path therethrough, the arcuate path becoming linear upon exit from the field of deflection coil 16. This arcuate path may be regarded as having a radius $r$ directed from a point P as depicted in FIG. 1. The radius $r$ is determined by the following equation:

$$r = (m \cdot V)/(e \cdot B) \tag{1}$$

where $m$ = mass of electron, $V$ = velocity of electron, $e$ = electron charge and $B$ = magnetic field.

As referred to hereinbefore, the path of the electron beam 14 upon exiting the magnetic field of deflection coil 16 will once again be linear, and will be inclined with respect to the axis of the tube at an angle $\Delta$. Angle $\Delta$ is determined by the following equation:

$$\sin \Delta = t/r = (t \cdot e \cdot B)/(m \cdot V) \tag{2}$$

where $t$ = the length of deflection coil 16.

The field $B$ is proportional to the current $I$ applied to deflection coil 16, and is determined by the following equation:

$$B = \mu o \cdot I \cdot n \quad (3)$$

where $\mu o$ = permeability of air and $n$ = number of turns of deflection coil 16. COmbining equations 2 and 3, the sin of angle $\Delta$ may be expressed as follows:

$$\sin \Delta = (t \cdot e \cdot \mu o \cdot n \cdot I)/(m \cdot V) = K \cdot I \quad (4)$$

By geometry, the deflected distance $D$ on the front face 12 of cathode ray tube 10 is determined by the following equation:

$$D = \tan \Delta \cdot L \quad (5)$$

wherein $L$ = the distance from front face 12 of cathode ray tube 10 to the center of deflection coil 16.

Combining equations (4) and (5), and applying the mathematical law arc sin $x$ = arc tan $(x/\sqrt{1 - x^2})$, it can be shown that the distance $D$ is determined by the following equation:

$$D = (L \cdot I \cdot K)/\sqrt{1 - (K \cdot I)^2} \quad (6)$$

From equation (6), it is apparent that the actual deflection distance $D$ on the front face 12 of cathode ray tube 10 is not linearly related to the current $I$ in deflection coil 16. As is apparent from equation (6), as the current $I$ increases, the increase in deflection distance $D$ will be disproportionately large, so as to cause the pin cushion distortion referred to hereinbefore.

Ideally, the deflection distance of the cathode ray tube is directly proportional to the current $I$, to produce a linear, undistorted display. As briefly, referred to hereinbefore, such will be the case with an appropriately curved face cathode ray tube. Specifically, there is depicted in FIG. 1 in dashed line an ideal curved face 18. The deflection distance on the ideal curved face 18, namely, $D_o$, is determined by the following equation:

$$\sin \Delta = D_o/L = K \cdot I \quad (7)$$

From the foregoing, the difference between the actual deflection $D$ and the idealized deflection $D_o$ can be determined and expressed as a deflection error $E$, in percent, by the following equation:

$$E = (D_o - D)/(D_o) \cdot 100 = (\sin \alpha - \tan \alpha)/(\sin \alpha) \cdot 100 = [1 - (1/\cos\alpha)] \cdot 100 \quad (8)$$

It is thus apparent that the deflection error $E$ may readily be calculated or may otherwise be determined from observation and measurement of a particular cathode ray tube display. According to the present invention, a lens is disposed in front of front face 12 of cathode ray tube 10, the lens having an optical gain complementary to the deflection error $E$, to cancel or counteract the pin cushion distortion.

Figure 2:
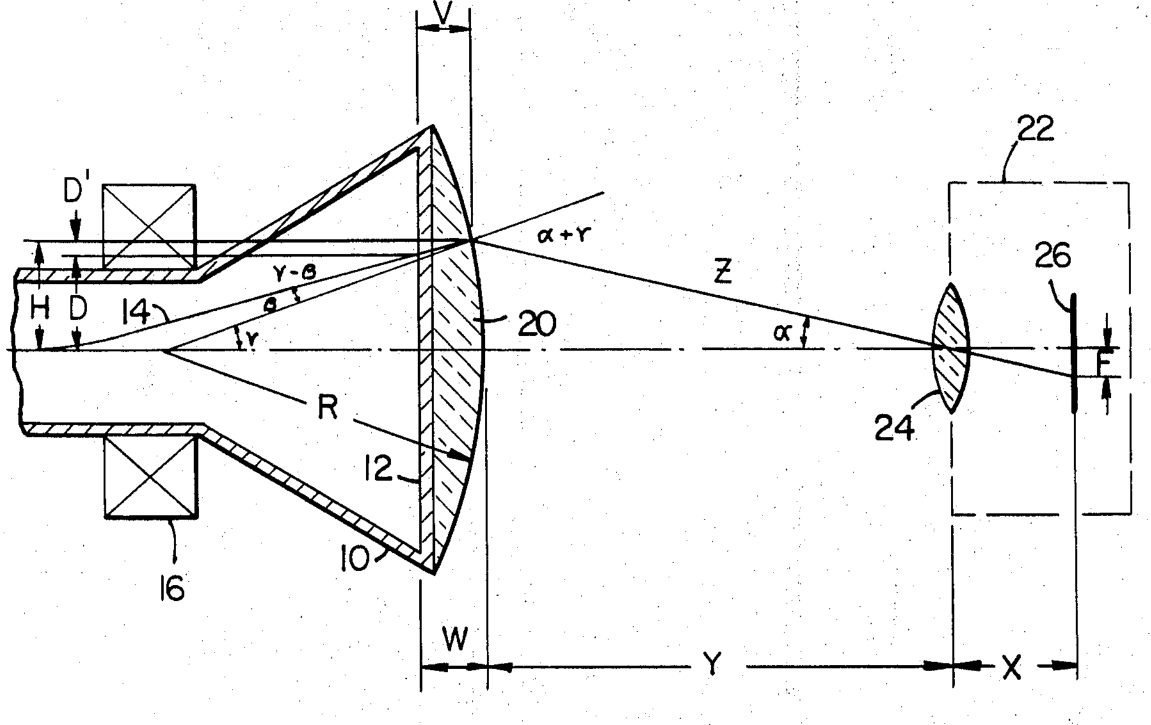
FIG. 2 is a side, cross-sectional view of a magnetically deflected cathode ray tube employing a pin cushion distortion correction lens according to the present invention.

Referring now to FIG. 2, there is depicted a pin cushion distortion lens 20 disposed in front of front face 12 of cathode ray tube 10. Distortion correction lens 20 is adapted to provide a gain pattern characterized by greater magnification in the center, and lesser magnification towards the edges, so as to counteract or cancel the pin cushion distortion referred to hereinbefore. In particular, the distortion correction lens 20 is depicted in FIG. 2 as being a planoconvex lens having a diameter substantially corresponding to the diameter of front face 12 of cathode ray tube 10. The radius of curvature of distortion correction lens 20 is determined by the amount of pin cushion distortion inherent in cathode ray tube 15 and the desired viewing distance, the object being, of course, to provide an optical gain pattern or magnification which is the complement of the pin cushion distortion so as to cancel or counteract same.

The appropriate radius of curvature of distortion correction lens 20 may be mathematically determined. Referring to FIG. 2, such calculations will now be described in detail. As depicted in FIG. 2, a camera 22, having a camera lens 24, is disposed in front of cathode ray tube 10 along the axis thereof. It is thus desired to photograph the images appearing on cathode ray tube 10, distortion correction lens 20 being employed to produce a linear and thus undistorted image on the film plane 26 of camera 22.

In order to determine the appropriate radius of curvature of lens 20, it is necessary to relate the deflection distance $D$ on the front face 12 of cathode ray tube 10 to the deflection distance $F$ on film plane 26 of camera 22. To this end, the geometric equations governing the optical path will now be presented.

Looking first at camera 22, it is apparent that $$\tan \alpha = F/X \quad (9)$$

wherein $X$ is the focal length of the camera lens 24.

We may next apply the law of cosines to the triangle determined by the three lines $R + Y$, $R$ and $Z$, as illustrated in FIG. 2, to form the following equation:

$$Z = (R + Y) \cos\alpha \pm \sqrt{\cos^2 \alpha \, (R + Y)^2} \quad (10)$$

It is further apparent that the angles $\alpha$ and $\gamma$ are determined by the following equations:

$$\sin \alpha = H/Z \quad (11)$$

and $$\sin \gamma = R/H \quad (12)$$

To further relate $D$ to $F$, the refractive properties of lens 20 yield the following equation:

$$\sin \beta = (\sin \alpha + \gamma)/nb \quad (13)$$

where $nb$ = index of refraction.

Since the lens 20 is a section of a sphere, the distance $V$ illustrated in FIG. 2 may be determined by applying the cut circle equation as follows:

$$V = W - R\ (1 - \cos \gamma) \tag{14}$$

$V$ is additionally determined by the simple geometric right triangle relationship as follows:

$$D' = V \cdot \tan\ (\gamma - \beta) \tag{15}$$

Of course, the deflection distance is determined by the following equation:

$$D = H - D' \tag{16}$$

It is thus apparent that the solution of the foregoing equations 9 through 16 geometrically relate deflection distance $D$ on the front face 12 of cathode ray tube 10 to the deflection distance $F$ on film plane 26 of camera 22. However, in order to determine whether the optical correction accurately complements the nonlinearity of the cathode ray tube, it is desirable to derive an error or nonlinearity function for the optical system for comparison with the cathode ray tube deflection error $E$. In this regard, we may define optical gain $G = D/F$. Of course, the optical gain in the center of the image $G_o$ is determined by the following equation:

$$G_o = D \overset{\text{Lim}}{\to} o\ (D/F \tag{17}$$

From the foregoing, the optical linearity error $Q$ may be expressed in percent according to the following equation:

$$Q = [(G_o - G)/G_o] \cdot 100 = [G_o - (D/f]/(G_o) \cdot 100 \tag{18}$$

Optical linearity error $Q$ may thus be compared with cathode ray tube deflection error $E$, at various deflection distances $D$, to determine if the optical gain provided by lens 20 substantially complements and thus cancels the deflection error.

In order to select an appropriate lens 20 for a particular application, the nonlinearity of the particular cathode ray tube must first be determined, either by measurement, or by calculation in accordance with equations 1 through 8. Thereafter, an appropriate distortion correction lens 20 may readily be calculated in accordance with equations 9 through 18. Of course, equations 9 through 18 may readily be recombined and/or rearranged to facilitate the solution thereof, depending upon the fixed and variable parameters of the particular application. For example, in certain instances the desired viewing distance may be fixed by physical considerations, so that the solution of equations 9 through 18 may proceed upon this basis. Alternatively, other physical parameters may be fixed by the realities of the particular application. Of course, the solution of equations 9 through 18 may be facilitated through the use of a digital computer.

In operation, a distortion correction lens 20 of suitable size and curvature to correct for the pin cushion distortion, as calculated in accordance with equations 9 through 18, is placed in front of front face 12 of cathode ray tube 10. Thereafter, deflection coil 16 may be energized as if the deflection produced thereby were linearly proportional to the current applied thereto. This will result in pin cushion distortion which will be optically corrected by lens 20, so that the image produced on the photographic film will be linear and thus undistorted.

The efficacy of the present invention may be demonstrated from the following table, which represents the solution of the foregoing equations for a particular example wherein the system parameters are as follows:

$L = 7.00$ inches  $R = 4.12$ inches
$X = 2.02$ inches  $Y = 13.0$ inches
$W = 0.75$ inches  $nb = 1.52$ inches

TABLE I

| [F] Radial Distance on Film (inches) | [D] Radial Distance on CRT (inches) | [E] (RT Deflection Error (percent) | [Q] Optical Correction (percent) | [E–Q] Linearity Error of System (percent) |
|---|---|---|---|---|
| 0.10 | 0.5007 | 0.3277 | –0.3207 | 0.0070 |
| 0.11 | 0.5512 | 0.3975 | –0.3894 | 0.0081 |
| 0.12 | 0.6017 | 0.4744 | –0.4652 | 0.0091 |
| 0.13 | 0.6524 | 0.5583 | –0.5482 | 0.0101 |
| 0.14 | 0.7033 | 0.6496 | –0.6387 | 0.0108 |
| 0.15 | 0.7543 | 0.7483 | –0.7368 | 0.0114 |
| 0.16 | 0.8054 | 0.8545 | –0.8426 | 0.0118 |
| 0.17 | 0.8567 | 0.9684 | –0.9566 | 0.0118 |
| 0.18 | 0.9082 | 1.090 | –1.078 | 0.0115 |
| 0.19 | 0.9600 | 1.220 | –1.209 | 0.0106 |
| 0.20 | 1.011 | 1.358 | –1.349 | 0.0093 |
| 0.21 | 1.064 | 1.505 | –1.498 | 0.0074 |
| 0.22 | 1.116 | 1.661 | –1.656 | 0.0047 |
| 0.23 | 1.694 | 1.826 | –1.824 | 0.0013 |
| 0.24 | 1.222 | 2.000 | –2.003 | –0.0029 |
| 0.25 | 1.275 | 2.184 | –2.193 | –0.0083 |
| 0.26 | 1.329 | 2.379 | –2.393 | –0.0147 |
| 0.27 | 1.383 | 2.583 | –2.606 | –0.0223 |
| 0.28 | 1.438 | 2.799 | –2.831 | –0.0312 |
| 0.29 | 1.493 | 3.027 | –3.068 | –0.0416 |
| 0.30 | 1.548 | 3.266 | –3.320 | –0.0535 |
| 0.31 | 1.604 | 3.518 | –3.586 | –0.0671 |
| 0.32 | 1.661 | 3.784 | –3.867 | –0.0826 |
| 0.33 | 1.718 | 4.064 | – 4.164 | –0.1000 |
| 0.34 | 1.776 | 4.359 | –4.359 | –0.1196 |
| 0.35 | 1.835 | 4.669 | –4.810 | –0.1413 |

From Table I, it is apparent that the distortion correction lens according to the present invention substantially corrects for the deflection error of the cathode ray tube. In particular, it is apparent from the righthand column of Table I, wherein the difference between the cathode ray tube error $E$ and the optical error $Q$ is listed, that according to this example nonlinearity or distortion was substantially eliminated. In particular, the largest linearity error in Table I is less than 0.15 percent. Thus, the efficacy of the distortion correction lens of the present invention is apparent.

while a particular embodiment of the present invention has been described in detail, it is apparent that adaptations and modifications will occur to one skilled in the art to which the present invention pertains. In particular, a compound doublet may be employed in lieu of the simple planoconvex lens described, in order to achieve color correction. These and other adaptations and modifications may be made without departing from the spirit and scope of this invention, as set forth in the claims.

What is claimed is:

1. In a cathode ray tube display system having a flat-faced cathode ray tube, magnetic deflection coil means for deflecting the beam of said cathode ray tube in response to an electrical signal and a camera disposed at a distance from the face of said cathode ray tube along the axis thereof and adapted to photograph the images thereof the improvement comprising: a lens disposed in front of the front face of the said cathode ray tube adjacent thereto, said lens having an optical linearity error Q in accordance with the following equation:

$$Q = (G_o = G)/(G_o) \cdot 100$$

wherein $G_o$ is the optical gain along the axis of said tube and G is the optical gain at other deflection distances, said cathode ray tube having a deflection error $E$ in accordance with the following equation:

$$E = (D_o - D)/(D_o) \cdot 100$$

wherein $D_o$ is the idealized deflection and $D$ is the actual deflection for particular electrical signals applied to said magnetic deflection coil means, said optical linearity error $Q$ at said camera distance being substantially equal and opposite to the deflection error $E$ of said cathode ray tube at corresponding deflection distances from the axis of said cathode ray tube, to produce a substantially linear relationship between said electrical signal and the displacement of the image on the film plane of said camera.

2. Apparatus according to claim 1 wherein said lens comprises a planoconvex lens having a substantially constant radius of curvature.

* * * * *